United States Patent [19]
Dees

[11] Patent Number: 5,154,230
[45] Date of Patent: Oct. 13, 1992

[54] METHOD OF REPAIRING A WELLBORE LINER FOR SAND CONTROL

[75] Inventor: John M. Dees, Richardson, Tex.
[73] Assignee: Oryx Energy Company, Dallas, Tex.
[21] Appl. No.: 808,866
[22] Filed: Dec. 17, 1991

Related U.S. Application Data

[60] Division of Ser. No. 634,404, Dec. 27, 1990, Pat. No. 5,101,900, which is a continuation of Ser. No. 383,034, Jul. 21, 1989, abandoned.

[51] Int. Cl.$^5$ .................. E21B 33/138; E21B 43/12
[52] U.S. Cl. .................. 166/277; 166/288; 166/295; 166/299; 166/300
[58] Field of Search ........... 166/63, 276, 277, 295, 166/297, 299, 300, 288

[56] References Cited

U.S. PATENT DOCUMENTS

| | | |
|---|---|---|
| Re. 21,356 | 2/1940 | Pitzer .................. 166/279 |
| 1,588,643 | 6/1926 | Alexander . |
| 1,592,104 | 7/1926 | Hallvarson . |
| 1,734,670 | 11/1929 | Greene . |
| 2,569,893 | 10/1951 | Kendall et al. ........... 166/63 |
| 2,591,907 | 4/1952 | Greene . |
| 2,689,008 | 9/1954 | Allen . |
| 2,693,856 | 11/1954 | Allen . |
| 2,696,258 | 12/1954 | Greene . |
| 2,718,264 | 9/1955 | Allen . |
| 2,725,940 | 12/1955 | Shidell et al. ........... 166/63 |
| 2,756,826 | 7/1956 | Ebaugh . |
| 3,064,733 | 11/1961 | Bourne, Jr. . |
| 3,101,117 | 8/1963 | Scott et al. ........... 166/67 |
| 3,167,122 | 1/1965 | Lang .................. 166/277 |
| 3,174,545 | 3/1965 | Mohaupt . |
| 3,187,813 | 6/1965 | Greene, Jr. . |
| 3,194,310 | 7/1965 | Loomis .................. 166/277 X |
| 3,212,577 | 10/1965 | Holbert et al. . |
| 3,330,350 | 7/1967 | Maly . |
| 3,346,049 | 10/1967 | Brown . |
| 3,373,813 | 3/1968 | Jennings et al. . |
| 3,393,739 | 7/1968 | Rosenberg . |
| 3,416,603 | 12/1968 | Bernard . |
| 3,477,506 | 11/1969 | Malone .................. 166/277 X |
| 3,482,629 | 12/1969 | Suman, Jr. .................. 166/277 X |
| 3,709,296 | 1/1973 | Glenn, Jr. .................. 166/295 |
| 3,789,923 | 2/1974 | Garrett .................. 166/55.1 |
| 4,009,757 | 3/1977 | Vann .................. 166/276 |
| 4,034,811 | 7/1977 | Sparlin et al. .................. 166/295 |
| 4,081,031 | 3/1978 | Mohaupt .................. 166/63 X |
| 4,158,388 | 6/1979 | Owen . |
| 4,191,254 | 3/1980 | Baughman . |
| 4,589,490 | 5/1986 | Darr et al. .................. 166/276 |
| 4,662,451 | 5/1987 | Boade .................. 166/63 X |
| 4,683,943 | 8/1987 | Hill .................. 166/63 |
| 4,711,302 | 12/1987 | Jennings, Jr. .................. 166/299 X |
| 4,750,562 | 6/1988 | Jennings . |
| 4,751,966 | 6/1988 | Jones . |
| 4,787,456 | 11/1988 | Jennings et al. .................. 166/281 |
| 4,798,244 | 1/1989 | Trost . |
| 4,823,876 | 4/1989 | Mohaupt . |

FOREIGN PATENT DOCUMENTS 644174 4/1982 U.S.S.R. .
968333 10/1982 U.S.S.R. .

OTHER PUBLICATIONS

*The Oil Weekly*, pp. 16-17, Jul. 3, 1931.
McLemore, "Origins of Jet Perforating", *Petroleum Engineer International*, p. 74, Aug. 1978.
Schmidt, Warpinski & Cooper, "In Situ Evaluation of Several Tailored—Pulse Well-Shooting Concepts", Report presented at 1980 SPE/DOE Symposium on Unconventional Gas Recovery, Pittsburgh, Pa., May 18-21, 1980.
Smith & Schmid, "Application of an Alternate Stimulation Method for the Ferguson Sandstone in the Powder River Basin", Report presented at Rocky Mountain Regional Meeting, Casper, Wyo., May 21-23, 1984.
Beeman, "Shaped Charge/Armor Nemesis", *National Defense*, vol. LXII, No. 348, May-Jun. 1978.

*Primary Examiner*—George A. Suchfield
*Attorney, Agent, or Firm*—Pravel, Gambrell, Hewitt, Kimball & Krieger

[57] ABSTRACT

In a well treatment method, a fluid is positioned in a wellbore have formation perforations in alignment with the portion thereof to be treated. A gas generator is positioned in proximity with the fluid and is actuated to disperse the fluid within the wellbore in accordance with a pressure/time relationship. In the preferred embodiment of the invention, the fluid is a fluid resin material which is polymerized following operation of the gas generator to form a consolidated, porous, permeable matrix which retains sand and other fine materials while permitting the flow of production fluid into the well.

3 Claims, 10 Drawing Sheets

Fig. 1
Fig. 2
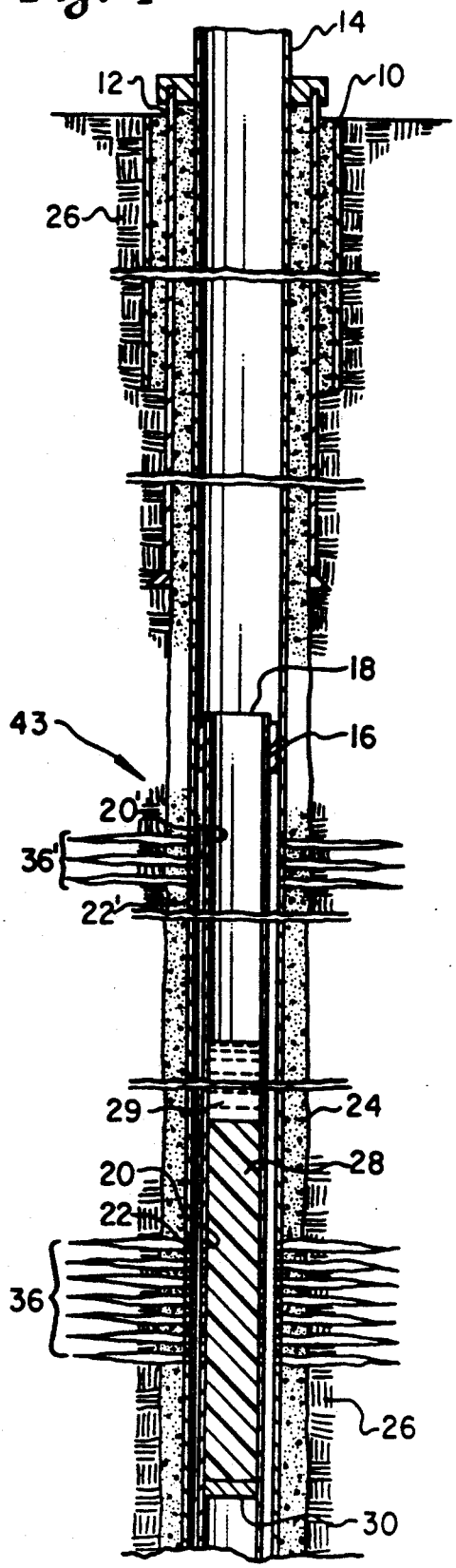
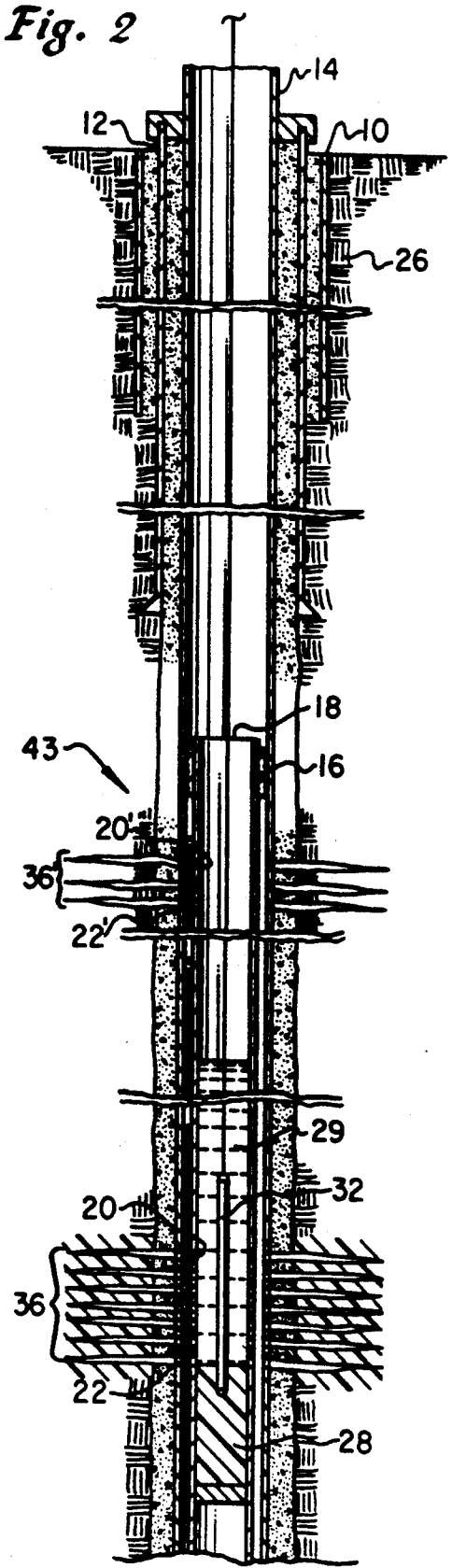

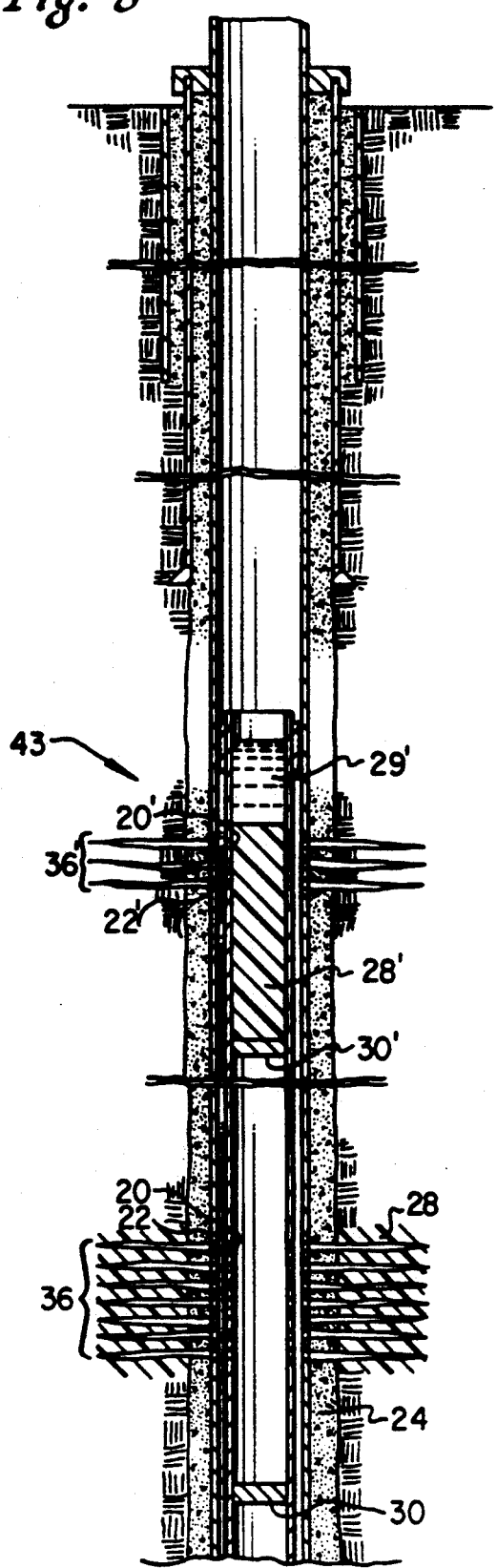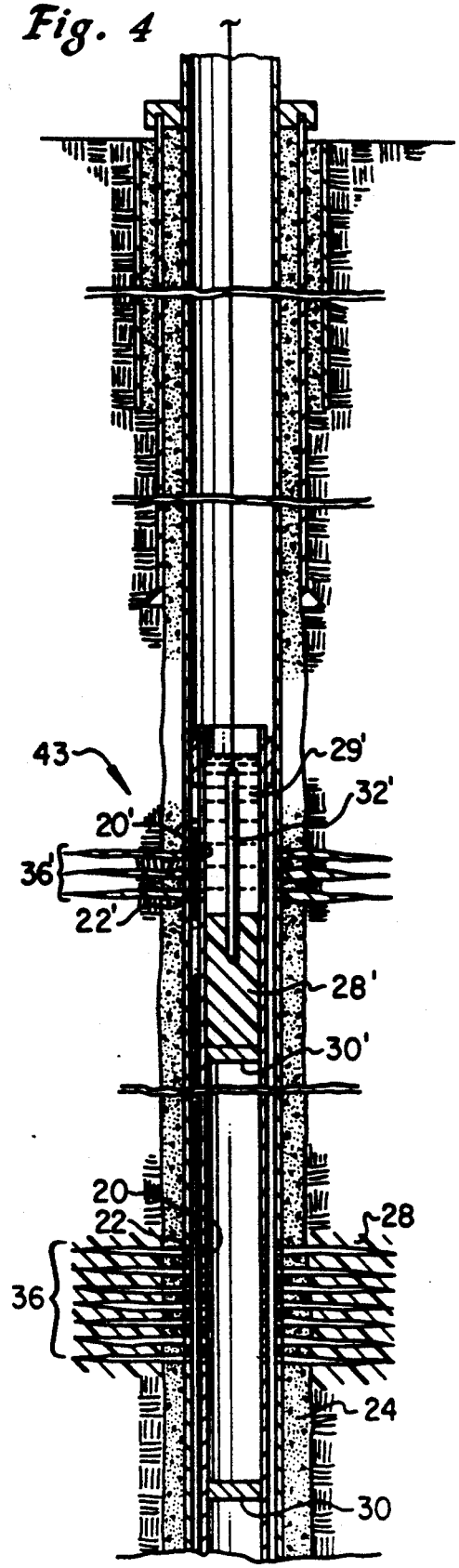

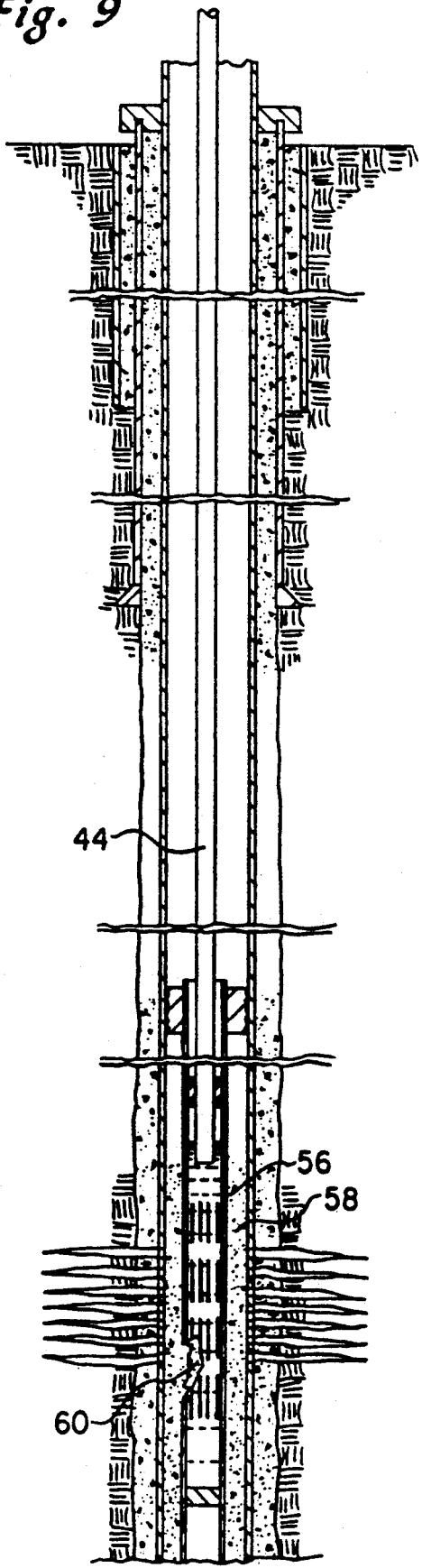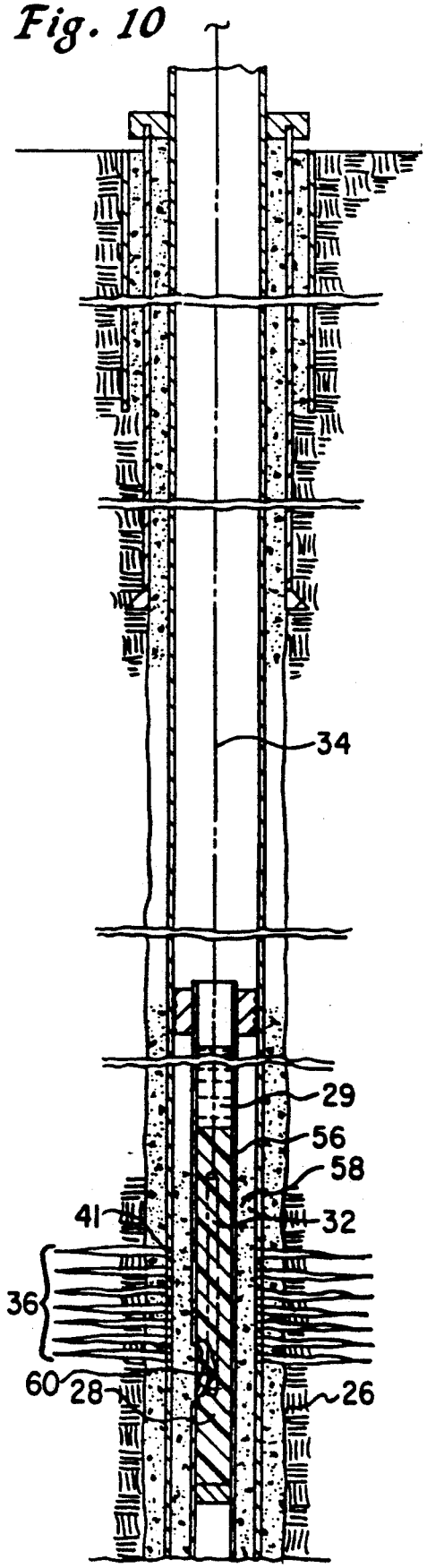

Fig. 13
Fig. 14
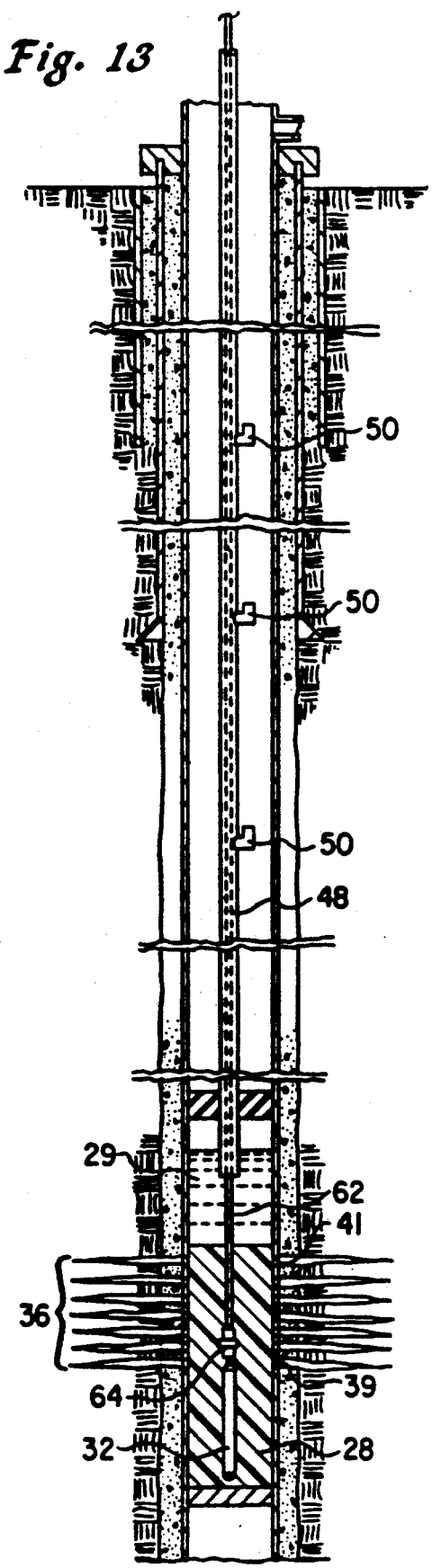
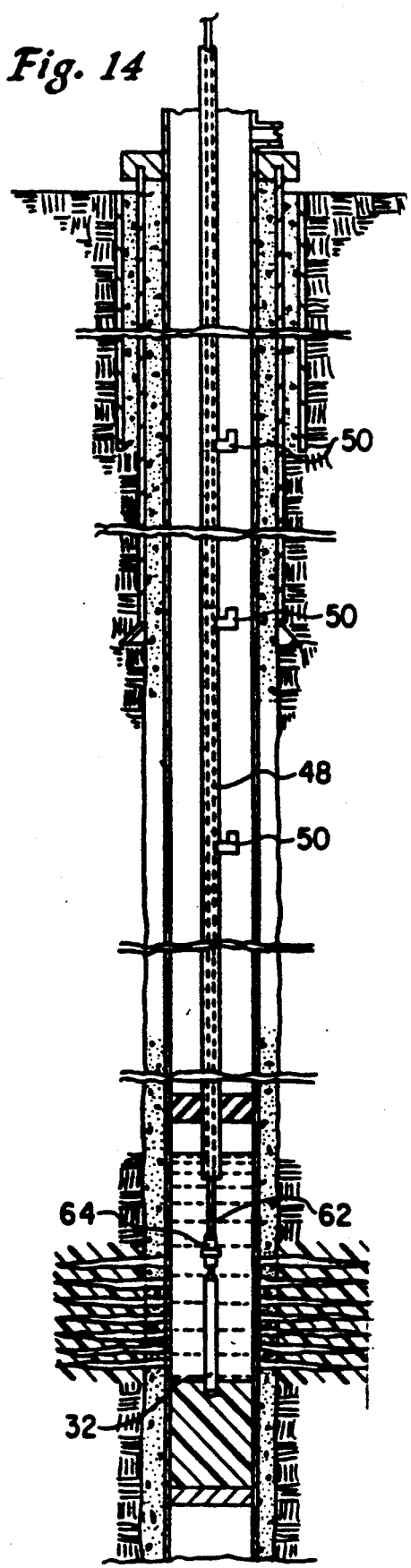

Fig. 15
Fig. 16
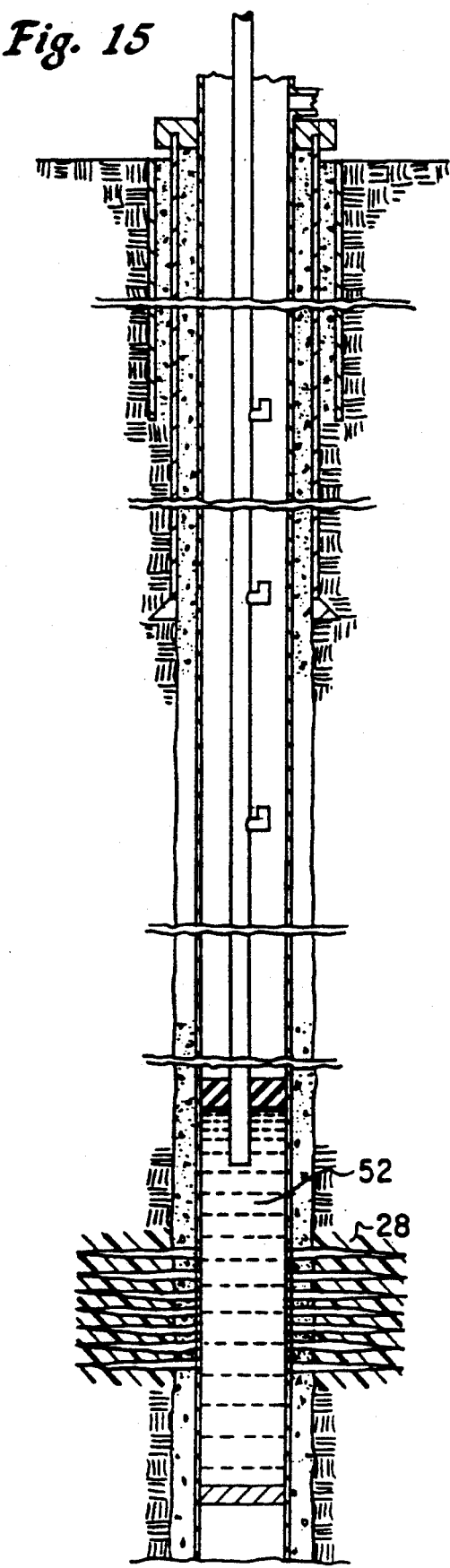
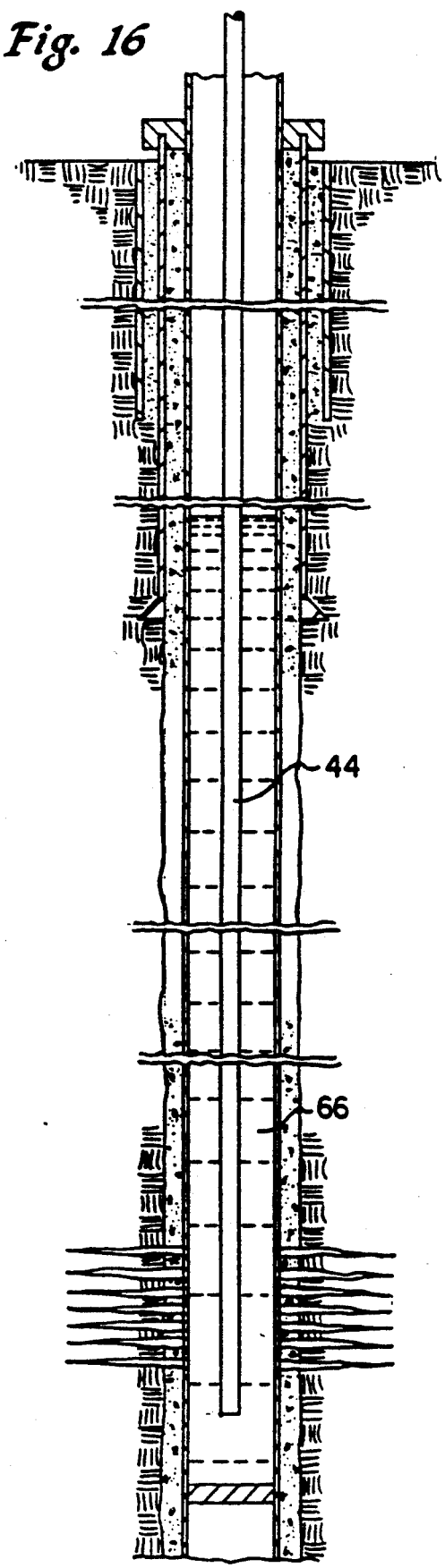

METHOD OF REPAIRING A WELLBORE LINER FOR SAND CONTROL

This is a division of Ser. No. 07/634,404 filed Dec. 27, 1990, now U.S. Pat. No. 5,101,900, which is a continuation of application Ser. No. 07/383,034 filed Jul. 21, 1989, now abandoned.

This invention relates generally to methods of treating wellbores, such as oil wells and the like, with selected fluids, and more particularly to a method of controlling the flow of sand and similar fine materials into the wellbore.

BACKGROUND AND SUMMARY OF THE INVENTION

As is well known, the flow of sand and similar fine materials into a wellbore, such as an oil well or the like, can virtually halt production from the well in a relatively short period of time. Heretofore, various techniques have been used to control the flow of sand into a wellbore. For example, techniques exist for constructing wire mesh cages, screens, slotted liners, gravel packs, formation consolidations and gravel consolidations within a wellbore which in turn retain one or more layers of fill material. In this manner the flow of production fluids into the wellbore is permitted, but sand and other fine materials are prevented from entering the well.

Another known technique for effecting sand control in oil wells and similar wellbores involves the use of commercially available fluid resin materials. Heretofore, the fluid resin materials have been dispersed into the formation perforations within the wellbore by means of hydraulic pressure. The resin materials subsequently polymerize to retain sand and similar fine materials while permitting the flow of production fluids into the well.

It has been found that the hydraulic pressurization technique requires the use of substantial quantities of fluid resin material in order to effect sand control in a typical wellbore. It is theorized that because the hydraulic pressurization technique applies a relatively low pressure over a relatively long period of time, the fluid resin material is allowed to follow paths of least resistance. These relatively open fluid flow paths must be substantially filled with the fluid resin material before other, more restrictive flow paths receive a sufficient quantity of the fluid resin material to effect sand control. Indeed, in many instances the fluid resin material does not reach all the perforations.

Commercially available fluid resin materials used to effect sand control in wells are quite expensive, thus, any excess usage of the fluid resin materials raises the cost of well treatment significantly. In many instances the material costs associated with prior art fluid resin sand control techniques are so high that the use thereof is negated in marginally productive wells.

In accordance with the present invention, a gas generator is utilized to disperse a fluid resin material within the formation perforations in order to effect sand control in the well. More specifically, a quantity of fluid resin material is placed within the wellbore in alignment with the formation perforations and a gas generator is positioned in proximity with the quantity of fluid resin material. Subsequently, the gas generator is actuated to disperse the fluid resin material within the formation perforations in accordance with a pressure/time relationship. It has been found that the use of the present invention requires substantially less fluid resin material to effect sand control than is required when the prior art hydraulic pressurization technique is employed. Thus, the material costs involved in the use of fluid resin materials to effect sand control is substantially reduced when the present invention is employed Additionally, the present invention increases well productivity and is less damaging to the permeability of the formation. More importantly, the present method results in greater sand control Some commercially available fluid resin materials, including externally catalyzed resins such as furan and phenolic resins, that are utilized for sand control in oil wells and the like, require the use of acid to polymerize the resin materials. Other commercially available fluid resin materials, including internally catalyzed resins such as epoxy resins, polymerize at a slower rate in the presence of acid and may require the use of a flush solution such as oil or brine to restore the permeability of the formation.

It has been found that the products of combustion resulting from the use of the gas generator may be sufficiently acidic to polymerize the resin without the necessity of introducing acid into the well for polymerizing the fluid resin material. In those instances the use of the present invention further reduces material costs by eliminating the necessity of using acid to polymerize the resin material.

In some embodiments utilizing externally catalyzed fluid resins the addition of acid aids in the polymerization of the fluid resin material and, consequently increases sand control. In some embodiments utilizing internally catalyzed resins, the presence of acid inhibits the polymerization of the fluid resin and may be used to delay polymerization.

Although primarily directed to fluid resin type sand control techniques, the present invention may also be utilized to apply other fluids, such as chemicals for controlling sand, water, clay, scale, corrosion, oxidation emulsions, paraffin or pH for well treatment to selected regions of a wellbore. Thus, in accordance with the broader aspects of the invention, a selected fluid is aligned within a predetermined region of a wellbore. Thereafter, a gas generator is positioned in proximity with the fluid and actuated to force the fluid resin material into the selected region of the wellbore in accordance with a pressure/time relationship. In this manner, the selected region of the wellbore is treated with the fluid in a substantially instantaneous but controlled manner in order to treat substantially all portions of the selected region of the wellbore in an identical manner while requiring a minimum amount of fluid.

Thus, the present invention provides numerous advantages over the prior techniques, while eliminating deficiencies therein.

BRIEF DESCRIPTION OF THE DRAWINGS

A more complete understanding of the invention may be had by reference to the following Detailed Description when taken in conjunction with the accompanying Drawings, in which:

FIG. 1 is a cross-sectional illustration of a wellbore having a perforated production casing and a perforated liner, illustrating the formation perforations, a quantity of fluid resin positioned in alignment with certain of the formation perforations and the gas generator positioned in the wellbore;

FIG. 2 is a cross-sectional view of the wellbore shown in FIG. 1 illustrating the result obtained by means of the invention;

FIG. 3 is a cross-sectional view of the wellbore shown in FIG. 1 illustrating a second quantity of fluid resin to effect sand control in a second formation perforation;

FIG. 4 is a cross-sectional view of the wellbore shown in FIG. 3 illustrating the gas generator positioned and the result obtained in the second formation perforation by means of the invention;

FIG. 9 is a cross-sectional illustration of a wellbore having a perforated production casing and a slotted cage and gravel pack, illustrating the formation perforations and damage to the slotted cage;

FIG. 10 is a cross-sectional view of the wellbore shown in FIG. 9 illustrating removal of the production tubing and positioning of a quantity of fluid resin in alignment within the damaged portion of the slotted cage, the formation perforations and a gas generator positioned in the wellbore;

FIG. 13 is a cross-sectional view of the wellbore shown in FIG. 12, illustrating a gas generator, attached to a valve and coiled tubing, inserted through the production tubing and further illustrating the positioning of the valve below the bottom formation perforation and a quantity of fluid resin being placed into the wellbore;

FIG. 14 is a cross-sectional view of the wellbore shown in FIG. 12 illustrating the result obtained by means of the invention;

FIG. 15 is a cross-sectional view of the wellbore shown in FIG. 12 showing production tubing in the treated well;

FIG. 16 is a cross-sectional illustration of a wellbore having a perforated production casing, illustrating production tubing in place, formation perforations, and a quantity of field brine in the wellbore;

DETAILED DESCRIPTION OF THE INVENTION

Figure 5:
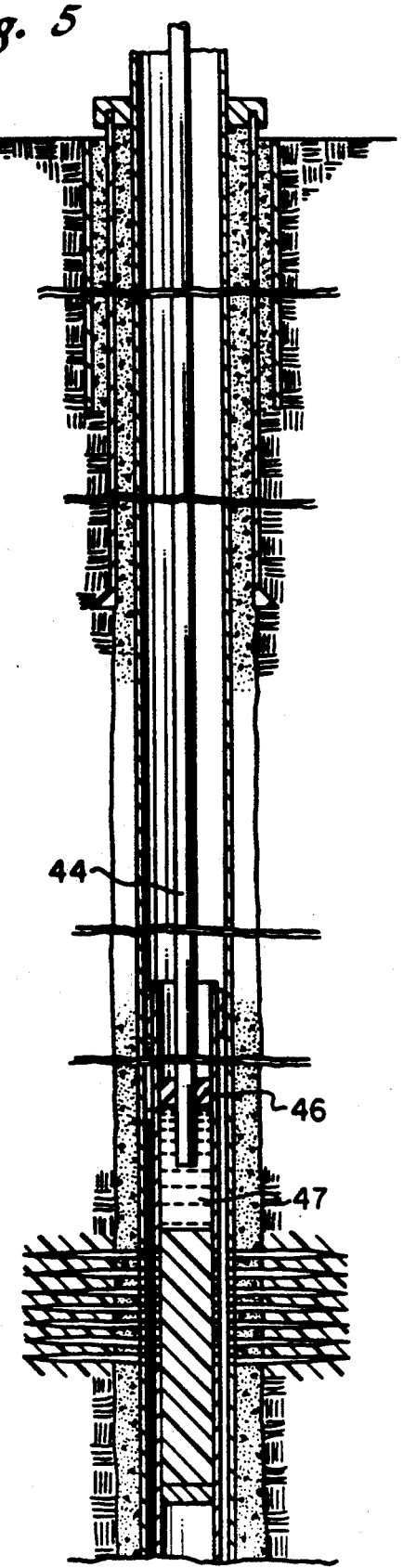
FIG. 5 is a cross-sectional view of the wellbore shown in FIG. 1 illustrating subsequent treatment steps.

FIG. 1 is a cross-sectional view of a wellbore in which a drive casing 10 has been driven into the earth 26, a surface casing 12 has been placed and into which a production casing 14 has been set. By way of example only, the drive casing 10 may be approximately 107 feet of 16 inch diameter pipe, the surface casing 12 may be approximately 1,025 feet of 10.75 inch diameter pipe and the production casing 14 may be approximately 4,000 feet of 7 inch diameter pipe. A 4.5 inch diameter liner 16 may be placed in the well with the top, for example, at 3,530 feet and the bottom at 4,000 feet.

The liner 16 is held in place by a liner hanger 18. Normally the volume between the liner 16 and production casing 14 is sealed with cement. The liner 16 has a line of perforations 20 therein while production casing 14 has a line of perforations 22 therein. Normally, production fluid, i.e., oil, flows from perforation 36 in the formation 26 through the perforations 20 and 22 to the interior of the liner 16 from which it will be produced. In some cases, however, sand and other fine materials flow into the well with the production fluid. The sand eventually covers the perforations of the well, thereby either preventing effective lifting of oil out of the well or flowing with the produced oil causing damage to surface equipment. Various techniques have been used heretofore to restrain the entry of sand into such a well while permitting the flow of production fluids and thereby maintaining the well in production.

In accordance with one embodiment of the present invention, a plug 30 is placed in the liner 16 at a given depth below the casing perforations 20 and 22. The plug 30 may be of any commercially available type all well-known in the art. A fluid resin 28, such as that sold under the trademark "HYDROFIX" is then positioned in the well to a level normally above the highest perforation in the formation perforations 36. Additionally, a fluid head 29 comprising a quantity of brine may be positioned above the fluid resin 28.

Figure 7:
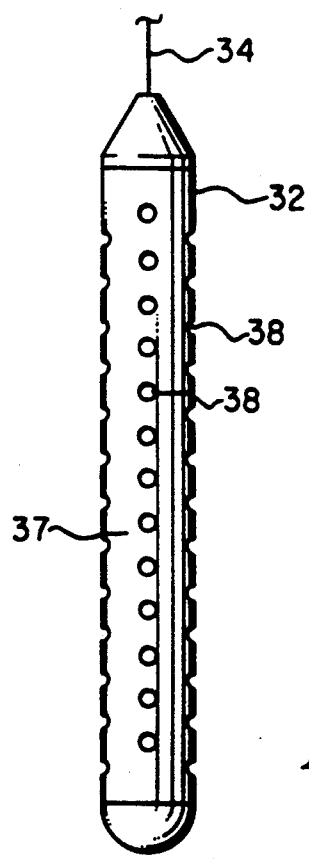
FIG. 7 is a diagrammatic representation of the gas generator of the present invention.

A gas generator 32 is lowered into the well on a wire line 34 as illustrated in FIGS. 1 and 2. The gas generator 32 may be of the type sold by Servo-Dynamics, Inc. under the trademark "STRESSFRAC" and is of such a length that it extends across all of the perforations 20 and 22. As is best shown in FIG. 7, the gas generator 32 is cylindrical in shape and comprises a length of steel tubing 37 having holes 38 formed therein The gas generator 32 contains a propellant such as M-5 or HXP-100, modified nitrocellulose, or modified and unmodified nitroamine or any other conventional solid rocket fuel propellant, which, when ignited, generates combustion gases and raises the pressure in the wellbore in a controlled, but substantially instantaneous manner, thereby forcing the fluid resin 28 through the perforations 20 and 22 and into the formation perforations 36.

Any conventional means may be utilized to position the fluid resin 28 and gas generator 32 relative to each other and the formation perforations 36. One example of such means includes the use of a gamma ray detector in connection with a radioactive isotope in the fluid resin 28. A second example of such conventional means includes the use of a device connected to the drill string or tool capable of measuring fluid densities.

The nature of the "HYDROFIX" fluid resin, an externally catalyzed resin, is such that it is polymerized by acid. While the exact nature of the products of combustion formed by operation of the gas generator 32 are not known, it is possible for sufficient acid to be formed during operation to polymerize the fluid resin 28. During the polymerization reaction the fluid resin 28 combines with sand or other fine materials from the production fluid to form a consolidated, permeable, porous matrix which allows production fluids to freely enter the well while preventing sand from doing so. Other usable externally catalyzed fluid resins also require the presence of acid for polymerization. Internally catalyzed fluid resin materials, however, may be substituted in those instances when a longer polymerization time is required since the presence of acid inhibits polymerization in internally catalyzed fluid resins.

Since the matrix is formed across all of the perforations 36 in the formation 26, it holds the well open by preventing the flow of sand and other fine materials into the perforations 36, thereby allowing the production fluid to flow through the perforations, the perforations 20 and 22, and into the production casing 14 on a continuing basis.

Figure 8:
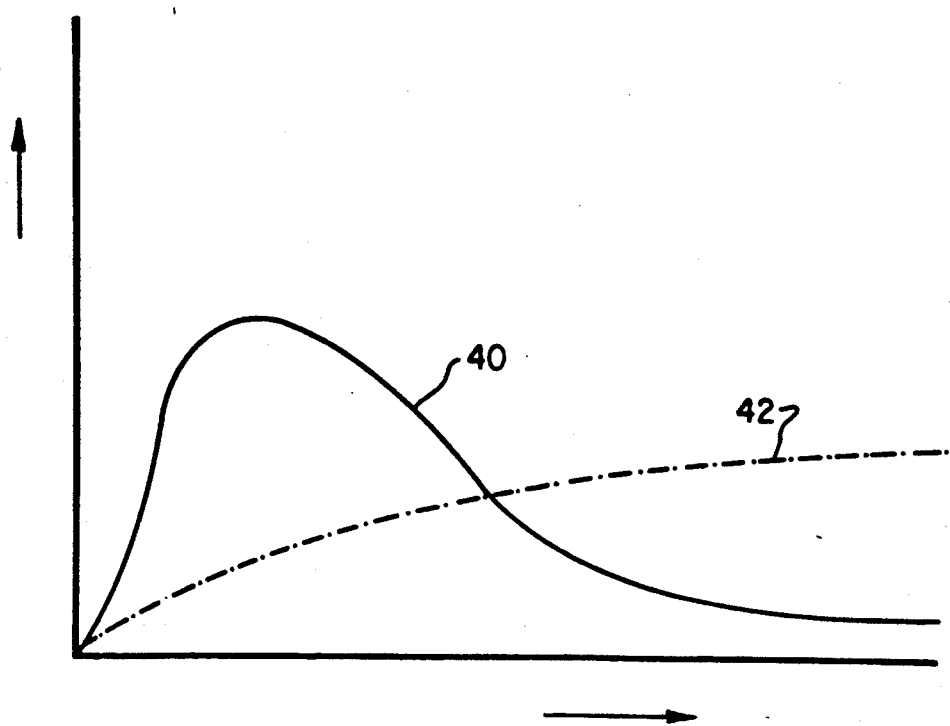
FIG. 8 is a graph comparing the pressure/time relationship indicative of the use of the gas generator of the present invention with that indicative of the hydraulic pressurization technique

As is shown in FIG. 8, operation of the gas generator 32 creates extremely high pressures within the wellbore over a short period of time, the pressure/time relationship being illustrated by graph 40 in FIG. 8. The pressure build up occurs substantially instantaneously, within milliseconds after the ignition of the propellant within the gas generator 32 and substantially exceeds the in situ well pressure, thereby forcing the fluid resin 28 into all of the perforations 36. Substantially equal pressure is applied along the entire length of the gas generator 32 thereby causing the fluid resin 28 to enter each of the perforations 36. Also, the pressure pulse is of sufficient duration to cause the fluid resin 28 to penetrate each perforation Because relatively high, but substantially equal, pressure is applied to all the perforations over a relatively short period of time, considerably less fluid resin 28 is required to treat the perforations 36 and/or the well than would otherwise be the case. In addition, the combustion gases and various by products thereof follow the fluid resin 28, forced through the perforations and into the formation sand, and may help to polmerize the resin 28. Use of the gas generator 32 may also create small radial vertical fractures in the perforations 36 aiding in the dispersion and polymerization of the fluid resin 28.

The pressure/time relationship that characterizes the prior art technique of using hydraulic pressure to force fluid resin 28 into the perforations 36 of the well is illustrated by graph 42 in FIG. 8. The prior art technique, however, did not necessarily involve fracturing before using the hydraulic pressure injection The hydraulic technique utilizes a much lower maximum pressure which is applied over a much longer period of time when compared with the present invention. This allows the fluid resin to follow the paths of least resistance thereby requiring the use of substantial quantities of fluid resin in order to assure that all of the well perforations receive the fluid resin, which in turn assures control over sand entering the well. Indeed, when the hydraulic pressurization technique is used, in many instances the fluid resin 28 does not ever reach all the perforations 36 in formation 26 and, thus, does not treat the perforations with resin.

Referring again to FIGS. 1–4, in many instances the wellbore will pass through two or more producing formations. For example, the wellbore may pass through a zone 43 comprising a productive formation situated above or below the producing formation originally subjected to the sand control method of the present invention as described herein above. Under some circumstances it may be necessary to treat two or more formations within the wellbore with the sand control method of the present invention in order to fully prevent the entry of sand and other fine materials into the wellbore.

When it is desired to treat a second formation, such as the formation comprising the zone 43 of FIGS. 1–4, the steps comprising the method of the present invention may be simply repeated or the fluid resin 28 may be placed across both perforated zones 26 and 43 simultaneously and the gas generator 32 actuated at the lower of the two perforated zones 26, reloaded, lowered to perforated zone 43 and actuated a second time.

If the steps are repeated, a bridge plug 30' (FIGS. 3 and 4) is set in an appropriate location in the well, and a quantity of fluid resin 28' is positioned in the well above the bridge plug 30'. The quantity of the fluid resin 28,' which is introduced into the well, is sufficient that the fluid resin 28' extends above the perforation 20' and 22' and above the perforations 36' comprising the formation of the zone 43. A quantity of brine 29' is introduced into the wellbore above the fluid resin 28' to provide a pressure head.

The gas generator 32 is then introduced into the wellbore and is positioned in proximity with the quantity of fluid resin 28'. Subsequently the gas generator 32 is actuated to generate pressure within the fluid resin in a pressure/time relationship as represented by graph 40 of FIG. 8, thereby forcing the fluid resin into the perforations 36'. Simultaneously, operation of the gas generator 32 may produce sufficient acid to cause the fluid resin 28' to polymerize. The polymerization of the fluid resin causes the resin to bond with the sand in the production fluid within the well to form a consolidated, permeable, porous matrix which prohibits sand from flowing into the well through the perforations 36' while permitting free flow of production fluids from the producing formation represented by zone 43.

Referring to FIG. 5, in some instances it may be desired to displace additional amounts of fluid resin into the perforations in a particular producing formation. In such instances a length of tubing 44 with a packer 46 thereon may be lowered into the wellbore. A quantity of brine 47 is then injected down the tubing 44 into the area above the fluid resin. Although brine 47 is the preferred fluid, it should be understood that other conventional fluids such as nitrogen, carbon dioxide and oil may also be utilized for injection with the present invention The quantity of brine 47, and therefore the fluid resin, is then hydraulically pressurized to displace additional fluid resin into the formation perforations.

In some instances the products of combustion resulting from operation of the gas generator 32 do not form sufficient acid to completely polymerize the fluid resin. In such instances the apparatus shown in FIG. 5 may be utilized to introduce an acidic solution, such as a 10–15% solution of hydrochloric acid, into the well to complete polymerization of the resin. Utilizing the packer 46 the acid solution is pressurized sufficiently to squeeze the acid solution through the perforation of the production casing and the liner (if any) into the perforations extending into the producing formation, thereby assuring complete polymerization of the fluid resin within the perforations. As described hereinbefore the fluid resin then bonds with the formation sand and other fine materials to form a consolidated, permeable porous matrix. Thereafter the well is flushed with brine in the normal fashion to remove any remaining acid.

The method of the present invention is not limited to use in conjunction with the fluid resin sold under the trademark "HYDROFIX", but instead may be utilized in conjunction with any of the various commercially available resin materials such as epoxy, phenolic-furfuryl, phenolic, furan and phenol-formaldehyde resins which are utilized to effect sand control in oil wells and the like. The fluid resin may also comprise a mixture of epoxy, an internally catalyzed resin, and actuator which requires four or five hours to set, but which does not require the use of acid to effect polymerization. In those cases in which an internally catalyzed resin is used, the polymerization time may be retarded by the acidic by-products of combustion of the gas generator. Moreover, such epoxy resin may also require the use of a flush solution such as brine or oil to create the necessary permeability in the perforations 36. In such instances the method of the present invention is utilized to force the fluid resin material into the perforations.

Furthermore, the method of the present invention does not require the use of a fluid resin, but may also be used to treat wells by applying other fluids such as chemicals for controlling water, clay, scale, corrosion, paraffin, pH, emulsion or oxidation. Such control chemicals, depending on the parameter needing treatment in the wellbore, include, for example, hydroxyaluminum, zirconium oxychloride, quaternary amine polymers, cationic organic amine surfactants such as quaternary ammonium chloride, hydrochloric acid, acetic acid, hydroflouric acid, citric acid, sodium hydroxide, sodium carbonate, potassium hydroxide, potassium carbonate, ammonia, ammonium hydroxide, ammonium carbonate, cationic surfactants, nonionics, anionics, amphoterics, xylene, toluene, paraffin dispersants, paraffin inhibitors, sodium persulfate, ammonium persulfate, sodium perborate, sodium hypochlorite, calcium hypochlorite, hydrogen peroxide, sodium silicate, polyacrylamide, EDTA (ethylene diamaine tetra-acetic acid or salts), NTA (nitrilo-acetic acid or salts), sodium calcium polyphosphate and various polyphosphates or polyphosphanates.

Figure 6:
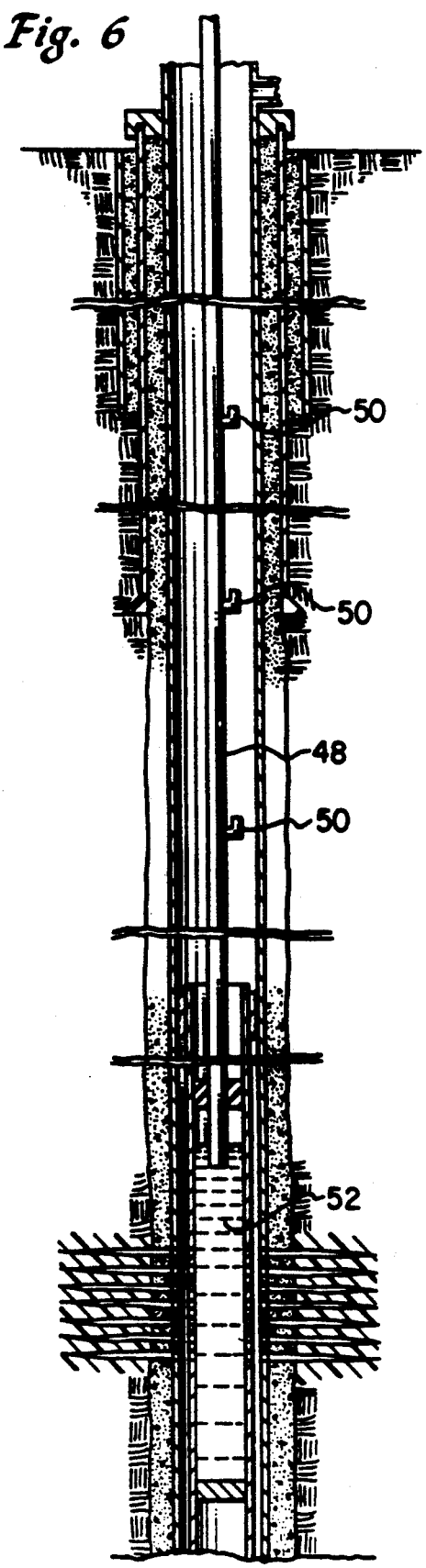
FIG. 6 is a cross-sectional view of the wellbore shown in FIG. 1 showing production tubing in the treated well.

Following the use of the method of the present invention to effect sand control, the well may be cleaned with brine in the normal fashion. Production tubing 48, as shown in FIG. 6, is then placed in the well, the well is put on production, and the production fluid 52 is pumped. The production tubing 48 may include gas lift valves 50 of the type well known in the art.

In another embodiment, the present invention is utilized to repair wire mesh cages, screens, slotted liners and other conventional gravel packs that retain one or more layers of fill-materials to prevent sand and other fine materials from entering the well. As illustrated in FIG. 9, a retainer 56 such as a slotted cage, having a fill-material 58 may become damaged 60 through ordinary wear and tear allowing sand and fill material to flow into the well. The present invention permits in-place repair of the retainer 56.

As shown in FIG. 10, fluid resin 28 is injected into the well to a level above the damaged area 60 of the retainer 56 and above the highest perforation 41 in the formation perforations 36 of the formation 26. A fluid head 29 comprising a quantity of brine is then positioned above the fluid resin 28.

Figure 11:
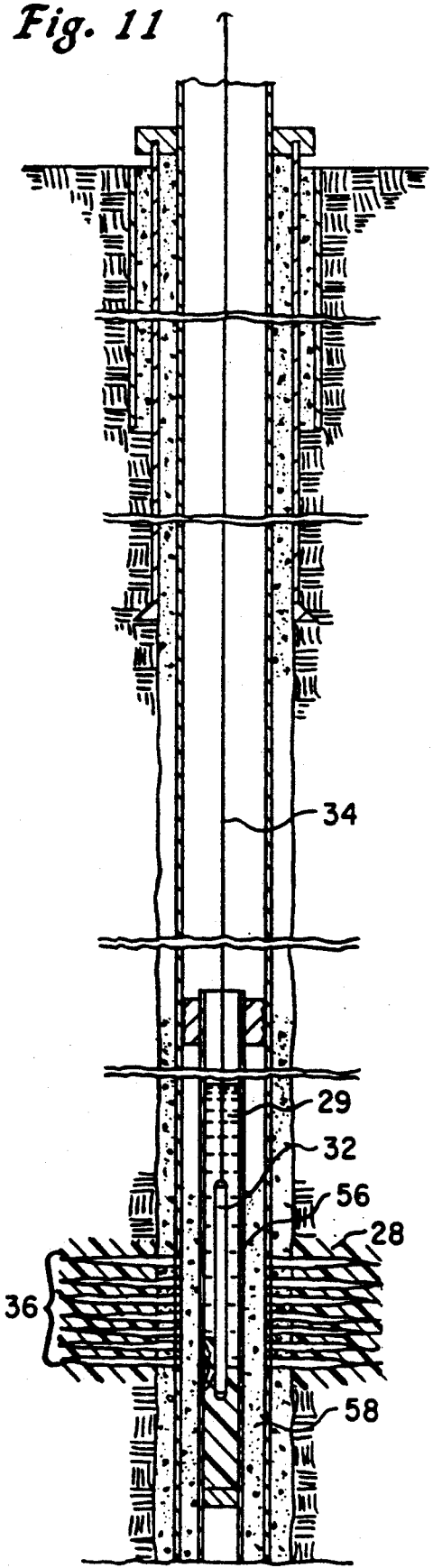
FIG. 11 is a cross-sectional view of the wellbore shown in FIG. 9, illustrating the result obtained by means of the invention.

A gas generator 32 is lowered into the well on a wire line 34 as illustrated in FIGS. 10 and 11. The gas generator 32 is positioned across the damaged area 60 and actuated forcing the fluid resin 28 into the formation perforations 36 and damaged area 60 of the retainer 56 where the fluid resin 28 polymerizes forming a consolidated, permeable, porous matrix. Any remaining fluid resin may be polymerized by introduction of an acidic solution, such as 10–15% hydrochloric acid, into the well. Thereafter the well is flushed with brine in the normal fashion to remove any remaining acid.

Figure 12:
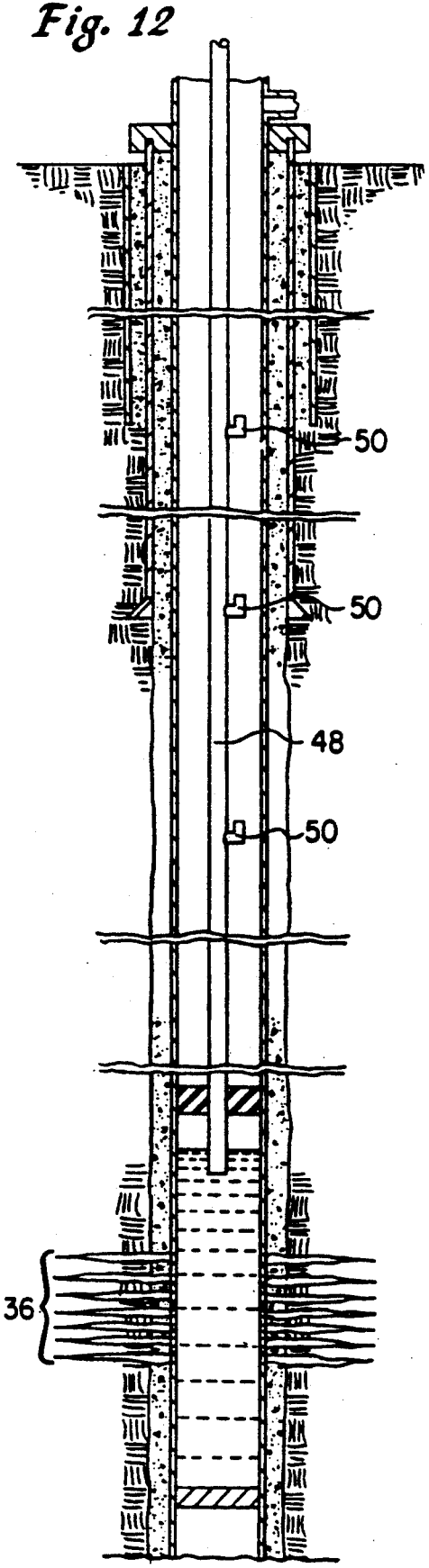
FIG. 12 is a cross-sectional illustration of a wellbore having production tubing and a perforated production casing, illustrating the formation perforations and a quantity of brine solution.

In some instances it may not be desirable or feasible to remove the production tubing from the wellbore before treatment, thus, in another embodiment, the present invention allows for treatment of a wellbore having production tubing 48 in place, as shown in FIG. 12.

As illustrated in FIG. 13, the gas generator 32 is lowered into the wellbore by means of coiled tubing 62. Connected between the coiled tubing 62 and the gas generator 32 is a valve or ported opening 64. The valve or ported opening 64 may be of any various commercially available type, all well-known in the art.

The gas generator 32 and valve 64 are positioned so that the circulating part of the valve 64 is just below the bottom perforation 39 of the formation perforations 36. Fluid resin 28 is then released through the valve 64 into the well to a level above the highest perforation 41 of the formation perforations 36. A fluid head 29 comprising a quantity of brine is then positioned above the fluid resin 28.

The gas generator 32 is then raised to a level across the perforations 36 and actuated to force the fluid resin 28 into the perforations 36 and to polymerize the fluid resin, as illustrated in FIG. 14. The gas generator 32, valve 64, and coiled tubing 62 are then removed and any remaining fluid resin is polymerized by introducing an acidic solution, such as a 10–15% hydrochloric acid solution into the well. The polymerized fluid resin then bonds with the formation sand to form a consolidated, permeable, porous matrix that allows the production fluid to flow freely while preventing the flow of sand or other fine materials into the wellbore.

Thereafter the well is flushed with brine in the normal fashion to remove any remaining acid. The well is then put back into production and production fluid 52 is pumped as illustrated in FIG. 15. The production tubing 48 may include gas lift-valves 50 of the type well known in the art.

In an additional embodiment, the present invention is used to treat a well already containing field brine 66 during workover operations as illustrated in FIG. 16.

Figure 17:
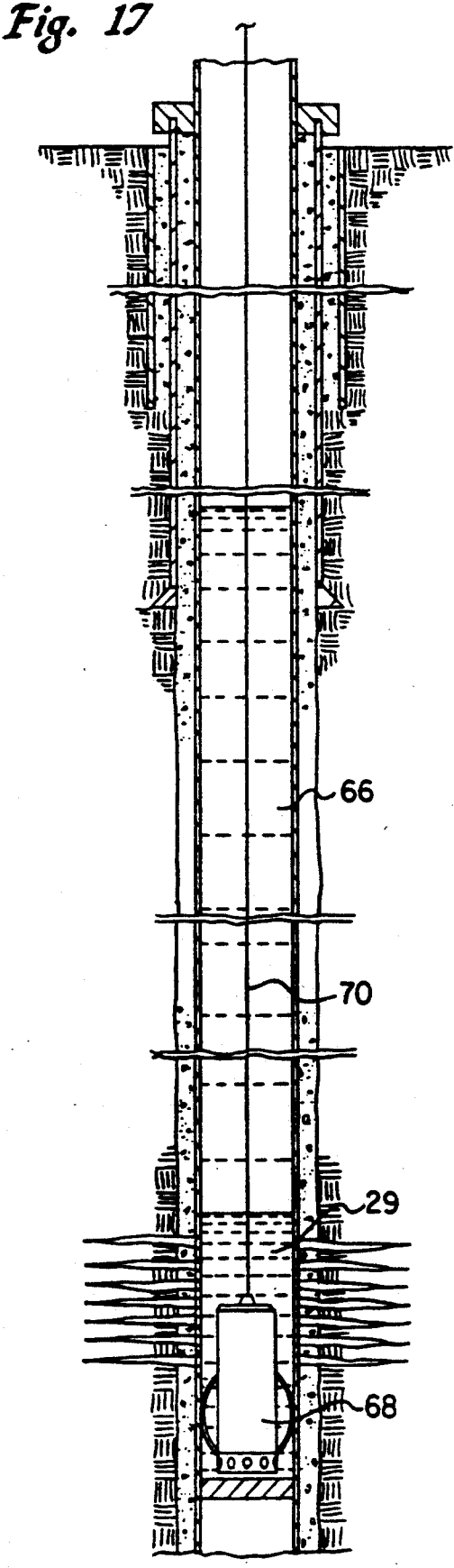
FIG. 17 is a cross-sectional view of the wellbore shown in FIG. 16, illustrating a bailer attached to a slickline and positioned at the bottom of the wellbore.
Figure 18:
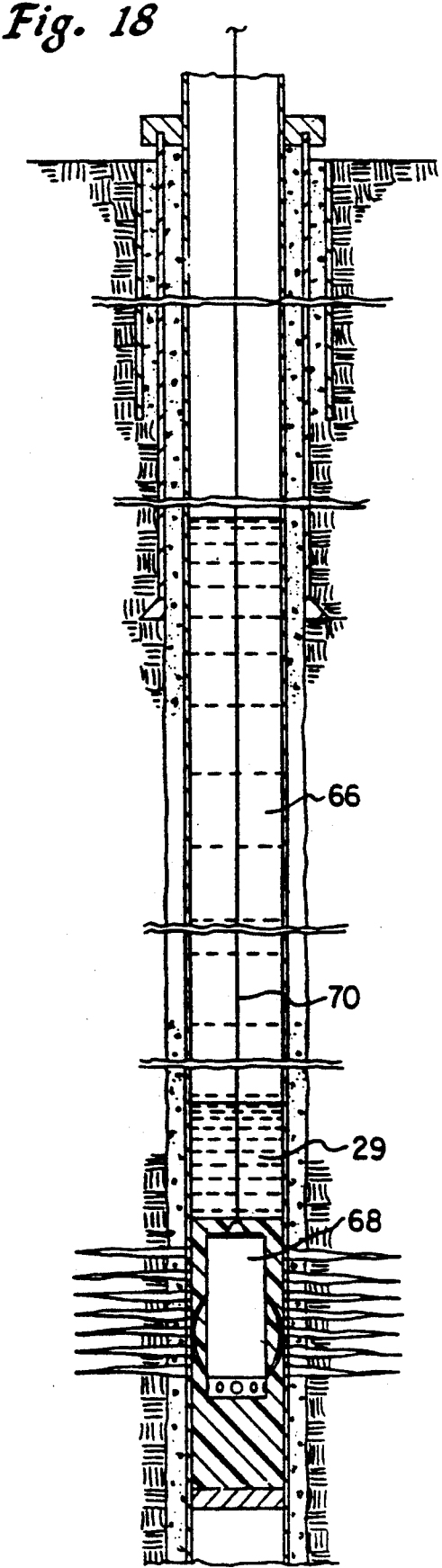
FIG. 18 is a cross-sectioned view of the wellbore in FIG. 16, illustrating the bailer releasing a quantity of fluid resin into the wellbore in alignment with the formation perforations.

As illustrated in FIG. 17, the production tubing is removed from the well, a bailer 68 is filled with a concentrated brine 29 and lowered into the well via a conventional slickline 70. The bailer then releases the brine 29 into the well. The bailer 68 may be of any commercially available type well-known in the art. As shown in FIG. 18, the bailer 68 is subsequently lowered into the well to a level across from the formation perforations 36 and fluid resin 28 is released from the bailer 68 into the well. A fluid head 29 comprising a quantity of brine 29 is then positioned above the fluid resin 28 also by means of the bailer 68.

Figure 19:
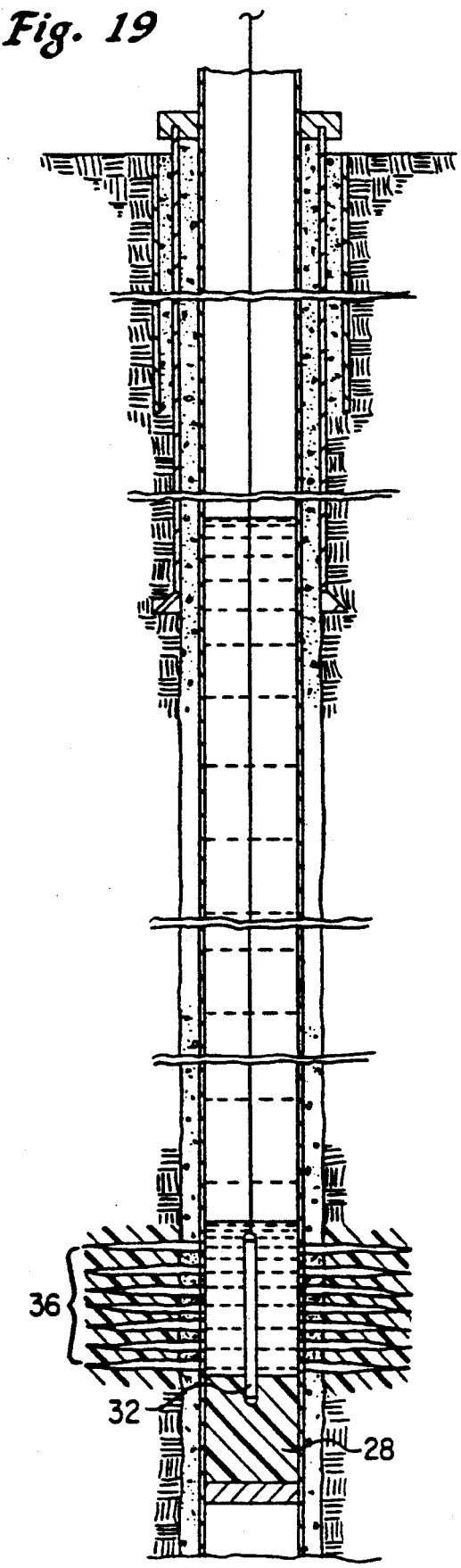
FIG. 19 is a cross-sectional view of the wellbore in FIG. 16, illustrating the result obtained by means of the invention.

Subsequently, a gas generator 32 is lowered into the well, as illustrated in FIG. 19, and positioned across the perforations 36. The gas generator 32 is actuated forcing the fluid resin 28 into the perforations 36, and polymerizing the fluid resin 28 to form a consolidated, permeable, porous matrix. If needed, an acidic solution, such as 10-15% hydrochloric acid, is introduced into the well to polymerize any remaining fluid resin. Thereafter the well is flushed with brine in the normal fashion to remove any remaining acid.

Thus, the present invention improves sand control in a wellbore by utilizing a gas generator having a propellant to create pressure in excess of the in situ well pressure and in accordance with a pressure/time relationship to assure treatment of all formation perforations with the desired fluid resin material. Use of the invention substantially reduces the amount of fluid resin required to effect sand control in the wellbore below the amount required when prior conventional hydraulic pressurization techniques are used.

More importantly, the present invention is more effective at sand control than the prior conventional hydraulic pressurization technique. Additionally, the products of combustion resulting from operation of the gas generator are sometimes sufficiently acidic or reactive that the necessity of introducing a acidic solution into the well to effect polymerization is eliminated.

Although preferred embodiments of the invention have been illustrated in the accompanying Drawings and described in the foregoing Detailed Description, it will be understood that the invention is not limited to the embodiments disclosed, but is capable of numerous rearrangements, modifications and substitutions of parts and elements without departing from the spirit of the invention.

Those skilled in the art will appreciate the fact that the present invention is not limited to sand control methods. The present invention may be used to treat a wellbore with virtually any desired fluid. All that is required is the positioning of the fluid in alignment with the portion of the wellbore to be treated, positioning the gas generator within the fluid, and actuating the gas generator to force the fluid to disperse within the wellbore in accordance with a pressure/time relationship.

I claim:

1. A method of repairing a damaged wellbore liner for controlling sand and other fine materials comprising the steps of:
   (a) positioning a quantity of fluid resin material in alignment with the portion of the wellbore liner to be repaired;
   (b) positioning a gas generator in proximity with the fluid resin material;
   (c) actuating the gas generator to increase wellbore pressure in a substantially instantaneous manner to a pressure substantially in excess of well pressure to force the fluid resin material from the wellbore into the damaged area of the wellbore liner; and
   (d) subsequently polymerizing the resin material to form a consolidated, porous permeable matrix that allows the flow of production fluid into the well while preventing the flow of sand, or other fine materials into the well through the previously damaged area of the wellbore liner.

2. The method of repairing a damaged wellbore liner in accordance with claim 1 wherein the fluid resin material is a furan resin.

3. The method of repairing a damaged wellbore liner in accordance with claim 1 wherein the fluid resin material is internally catalyzed.

* * * * *